United States Patent
Menon et al.

(10) Patent No.: US 11,917,699 B2
(45) Date of Patent: Feb. 27, 2024

(54) DEVICE TRACING ARCHITECTURE

(71) Applicant: SAP SE, Walldorf (DE)

(72) Inventors: Parthasarathy Menon, Bengaluru (IN); Srimukha Karantha Babukodi, Bengaluru (IN); Karthik H, Tumkur (IN); Subha Banerjee, Chinsurah (IN); Anshul Saxena, Bengaluru (IN); Balkrishnan Venkiteswaran, Bengaluru (IN); Abirami Sundaresan, Bengaluru (IN)

(73) Assignee: SAP SE, Walldorf (DE)

(*) Notice: Subject to any disclaimer, the term of this patent is extended or adjusted under 35 U.S.C. 154(b) by 291 days.

(21) Appl. No.: 17/408,832

(22) Filed: Aug. 23, 2021

(65) Prior Publication Data
US 2023/0058549 A1  Feb. 23, 2023

(51) Int. Cl.
*H04W 76/11* (2018.01)
*H04W 4/029* (2018.01)
*H04W 4/80* (2018.01)

(52) U.S. Cl.
CPC ............ *H04W 76/11* (2018.02); *H04W 4/029* (2018.02); *H04W 4/80* (2018.02)

(58) Field of Classification Search
CPC ................................. H04W 4/80; H04W 4/029
See application file for complete search history.

(56) References Cited

U.S. PATENT DOCUMENTS

| | | | |
|---|---|---|---|
| 10,146,512 B1* | 12/2018 | Chang | G06F 8/24 |
| 2014/0357192 A1* | 12/2014 | Azogui | H04W 8/005 |
| | | | 455/41.2 |
| 2015/0080032 A1* | 3/2015 | Moldavsky | H04W 4/02 |
| | | | 455/456.3 |
| 2015/0245167 A1* | 8/2015 | Bobrow | H04W 4/80 |
| | | | 455/41.2 |

(Continued)

*Primary Examiner* — Wen W Huang
(74) *Attorney, Agent, or Firm* — Buckley, Maschoff & Talwalkar LLC

(57) ABSTRACT

Systems and methods include reception, at a first device, of a wireless communication packet from a second device, determination, at the first device, of a received service identifier included in the wireless communication packet, determination, at the first device, of whether the received service identifier matches a first service identifier or a second service identifier, if the received service identifier matches the first service identifier or the second service identifier, establishment, at the first device, of a connection to a server of the second device using a device address included in the wireless communication packet, requesting, using the connection and at the first device, of a user identifier from the server of the second device, if the received service identifier matches the first service identifier, transmission, from the first device to a remote server, of a first indication of proximity of a user of the first device to a user associated with the user identifier and a second indication of proximity of the user associated with the user identifier to the user of the first device, and, if the received service identifier matches the second service identifier, transmission, from the first device to the remote server, of the first indication of proximity of the user of the first device to a user associated with the user identifier.

18 Claims, 7 Drawing Sheets

(56) References Cited

U.S. PATENT DOCUMENTS

| | | | |
|---|---|---|---|
| 2015/0319614 A1* | 11/2015 | Cho | H04W 4/02 |
| | | | 726/7 |
| 2016/0014677 A1* | 1/2016 | Chen | H04W 4/023 |
| | | | 455/434 |
| 2016/0050530 A1* | 2/2016 | Corbalis | G06Q 20/3278 |
| | | | 455/456.1 |
| 2016/0050564 A1* | 2/2016 | Niewczas | H04W 12/06 |
| | | | 455/411 |
| 2016/0105788 A1* | 4/2016 | Helms | H04W 40/244 |
| | | | 455/41.2 |
| 2016/0182170 A1* | 6/2016 | Daoura | H04W 12/033 |
| | | | 455/3.01 |
| 2016/0364862 A1* | 12/2016 | Reicher | G16H 50/50 |
| 2017/0171754 A1* | 6/2017 | South | H04W 12/06 |
| 2017/0359769 A1* | 12/2017 | Martono | H04W 40/244 |
| 2020/0100058 A1* | 3/2020 | Given | H04W 12/64 |
| 2020/0184518 A1* | 6/2020 | Bains | G06Q 10/00 |
| 2023/0058549 A1* | 2/2023 | Menon | H04W 76/11 |

* cited by examiner

500

| USERID1 | USERID2 | TIMESTAMP |
|---------|---------|-----------|
| X | W | TS4 |
| W | X | TS4 |
| Y | Z | TS3 |
| Z | Y | TS3 |
| X | Y | TS2 |
| Y | X | TS2 |

*FIG. 5*

DEVICE TRACING ARCHITECTURE

BACKGROUND

Many systems rely on accurate and timely tracing of the locations of devices, packages, components and/or people. For example, a shipping company may affix a barcode to a package, scan the barcode at various checkpoints throughout the package's journey, and report each scan to a central server so that the current location and future delivery time of the package may be estimated. In another example, an equipment leasing company may mount a GPS tracker to leased equipment, allowing the company to always pinpoint a location of the equipment.

Conventional tracing systems lack efficiency. In the shipping company case above, the barcode must be manually scanned at each checkpoint, requiring manual effort and dedicated scanning equipment. In the latter case, the GPS tracker is cost-prohibitive for many leasing scenarios. Moreover, conventional tracing systems provide specific locations and may therefore run afoul of privacy guidelines.

Some tracing systems attempt to use existing devices in a manner which requires minimal human intervention and which addresses privacy concerns. For example, in view of the ubiquity of mobile (i.e., cellular) phones, it has been considered to utilize phone-to-phone communication to trace a user's relative location with respect to other mobile phone users. However, disparate operating systems and device capabilities have heretofore prohibited efficient implementations of such a system.

BRIEF DESCRIPTION OF THE DRAWINGS

FIG. 5 is a tabular representation of tracing data according to some embodiments.

DETAILED DESCRIPTION

Figure 1:
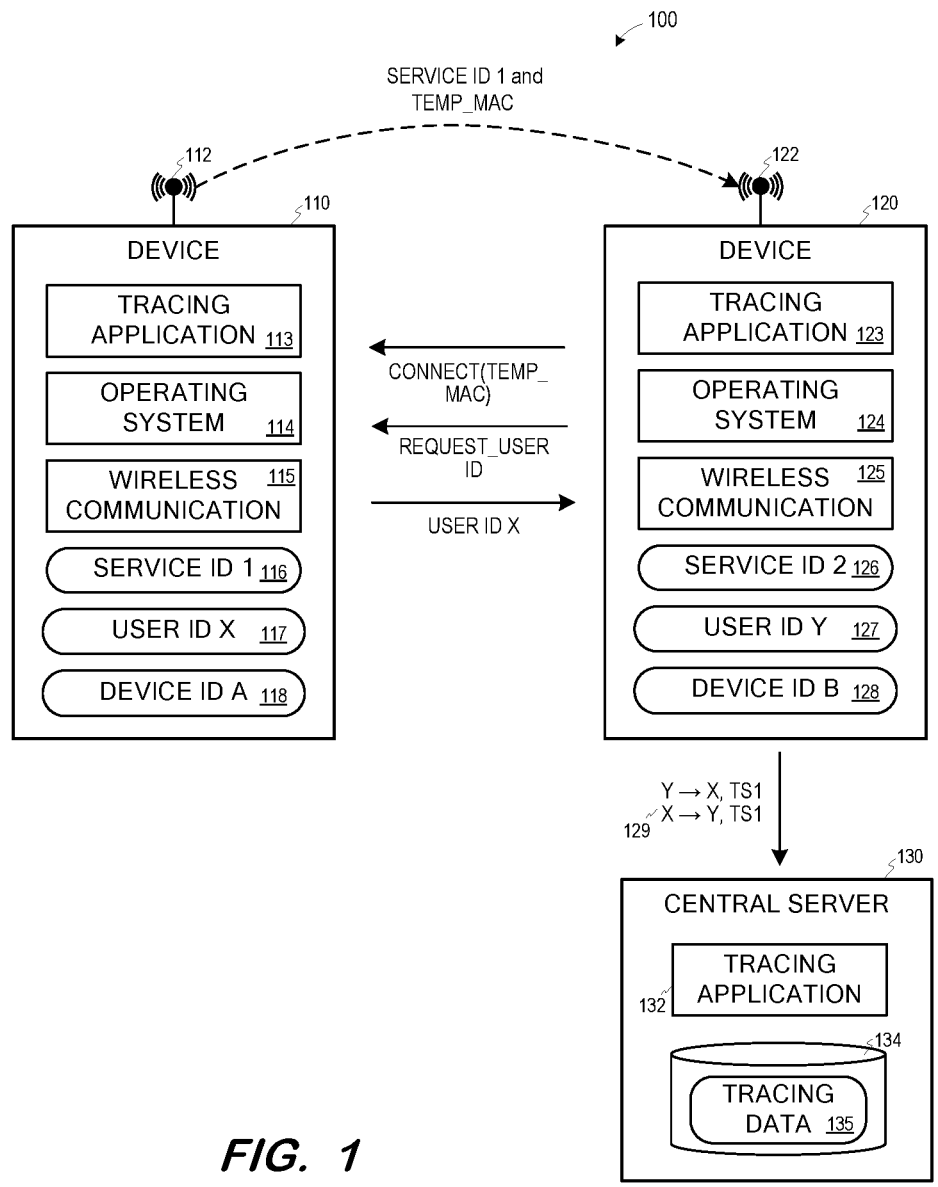
FIG. 1 is an architecture of a system to provide device tracing according to some embodiments.

The following description is provided to enable any person in the art to make and use the described embodiments. Various modifications, however, will remain readily-apparent to those in the art.

Some embodiments facilitate the tracing of a mobile device's proximity to other mobile devices, even in cases in which the mobile devices execute different mobile operating systems. Embodiments may be incorporated into contact tracing systems, equipment tracking systems, or any other suitable systems.

Bluetooth Low Energy (LE) is a wireless personal area network technology which can be used by applications (i.e., apps) executing on mobile operating systems to discover services, query for services and exchange small amounts of data with nearby devices. Bluetooth LE uses significantly less power than "classic" Bluetooth while maintaining a similar communication range. Mobile operating systems, including iOS, Android, Windows Phone and BlackBerry, natively support Bluetooth LE.

A Bluetooth LE-enabled device (i.e., a Bluetooth LE peripheral device) broadcasts an advertising packet including a Universally Unique Identifier (UUID) of a service and a temporary media access control (MAC) address of the device. Another Bluetooth LE-enabled device (i.e., a Bluetooth LE central device) scans for advertising packets and identifies an advertising packet which includes a UUID of a service of interest.

The scanning device may then request a scan response packet from the advertising device to acquire more information therefrom. Also or alternatively, the scanning device may discover capabilities of the advertising device by executing a Generic Attribute Profile (GATT) client to connect to a GATT server of the advertising device using the temporary MAC address of the advertising packet.

GATT is a generic specification for sending and receiving short pieces of data known as attributes over a Bluetooth LE link which has been established via advertising and scanning as described above. Each attribute is uniquely identified by a UUID, and may comprise a characteristic, a descriptor or a service. A characteristic contains a single value and 0-*n* descriptors that describe the characteristic's value. For example, a descriptor might specify a human-readable description, an acceptable range for a characteristic's value, or a unit of measure that is specific to a characteristic's value. A service is a collection of characteristics. For example, a heart rate monitor service may include a characteristic entitled "heart rate measurement."

Some embodiments contemplate a landscape including mobile devices executing the Android mobile operating system and the iOS operating system. In the Android implementation, a GATT client connected to a GATT server is automatically disconnected if the GATT client sees and attempts to connect to another GATT server. Due to this handling of multiple server connections, the above-described GATT client-server protocol is unreliable for transmitting data between Android devices over a Bluetooth LE link.

In the iOS implementation, a GATT client may queue servers to which a GATT client wishes to connect. However, an iOS-based advertising device cannot include additional data in a scan response packet. Rather, a scan response packet received from an iOS-implemented advertiser includes NULL. The above-described scan response packet therefore cannot be used to exchange data between iOS devices over a Bluetooth LE link.

Embodiments address the foregoing by configuring Android-based devices to detect other Android devices using advertiser/scanner communication only, and by configuring iOS-based devices to detect other iOS-based devices and Android-based devices using GATT client-server communication. Each Android-based therefore requires a GATT server to which an iOS-based device connects in the same manner as with iOS GATT servers.

According to some embodiments, each device will maintain a record of devices which it has detected, and these records may be periodically provided to a central server. The central server may then identify devices which have come into close contact with each other as well as secondary and tertiary contacts. Notably, Android-based devices will not detect iOS-based devices in some embodiments. Therefore, as will be described below, an iOS-based device which detects an Android-based device may report its contact with the Android-based device as well as the contact of the Android-based device with the iOS-based device to the central server.

FIG. 1 is an architecture to provide device tracing according to some embodiments. Device 110 and device 120 each support near-field wireless communication such as Bluetooth LE. Embodiments are not limited to Bluetooth LE. Each device includes a wireless communication antenna 112, 122 and a tracing application 113, 123 corresponding to its operating system 114, 124. It will be assumed that operating system 114 is different from operating system 124. For example, operating system 114 may comprise an Android operating system and operating system 124 may comprise an iOS operating system. Wireless communication components 115 and 125 are specific to the respective operating systems 114 and 124. In one non-exhaustive example, wireless communication component 115 does not support GATT server queueing and wireless communication component 125 does not support non-NULL scan response packets.

For purposes of the present example, tracing application 113 is compatible with operating system 114 and provides a service associated with service ID 1. Tracing application 123 is compatible with operating system 124 and provides a service associated with service ID 2. Data 116 and 126 store these service IDs on each of respective devices 110 and 120. Also stored on devices 110 and 120 are user identifiers 117 and 127. User identifiers 117 and 127 may be stored upon installation of tracing applications 113 and 123 and may either directly identify users of devices 110 and 120 or may be associated with each user (anonymously or otherwise) within a remote central server associated with tracing applications 113 and 123. Device IDs 118 and 128 may comprise temporary MAC addresses respectively associated with wireless communication components 115 and 125 of devices 110 and 120.

Central server 130 may comprise any computing system suitable for executing tracing application 132 and storing tracing data 135 within persistent storage 134. Central server 130 may comprise a standalone server computer, a distributed system, or a virtual machine, for example, and one or more elements of central server 130 may be cloud-based. Tracing application 132 may comprise program code executable to receive tracing data from various devices executing corresponding client tracing applications, to derive desired information from the tracing data (e.g., who was next to who at what time), and to present the derived data to a client tracing application executing on a mobile device or another device (not shown) which has access to tracing application 132.

According to some embodiments, each of devices 110 and 120 download and install respective tracing applications 113 and 123 for their respective operating systems 114 and 124. Installation may include registration with tracing application 132 so that tracing application 132 may associate each of devices 110 and 120 with a respective user and generate an application-specific user ID for each user. The user IDs are maintained in tracing data 135 and stored on the respective devices 110 and 120 as user ID X 117 and user ID Y 127.

FIG. 1 illustrates detection of device 110 by device 120 according to some embodiments. As will be described below, device 110 does not operate to detect device 120 in some embodiments.

According to FIG. 1, device 110 executes tracing application 113, which calls wireless communication component 115 to broadcast a packet including service ID 1 associated with tracing application 113 and temporary address device ID A associated with wireless communication component 115. Device 120, in turn, executes tracing application 123, which calls wireless communication component 125 to scan for a packet including service ID 1 or service ID 2 and determine a temporary address therefrom. Embodiments are not limited to Bluetooth LE implementations of wireless communication components 115 and 125 or the transmitted packet.

Using the temporary address device ID A, device 120 connects with wireless communication component 115 of device 110 and requests a user ID. In response, wireless communication component 115 wirelessly transmits user ID X 117 to device 120. Device 120 may locally store user ID X 117 and a timestamp indicating a time at which user ID X 117 was received. Tracing application 123 may at some point in the future establish a connection with tracing application 132 of central server 130 and provide data 129 indicating that user ID X was located proximate to user ID Y (of device 120) at timestamp TS1, and that user ID Y was located proximate to user ID X at timestamp TS1.

Figure 2:
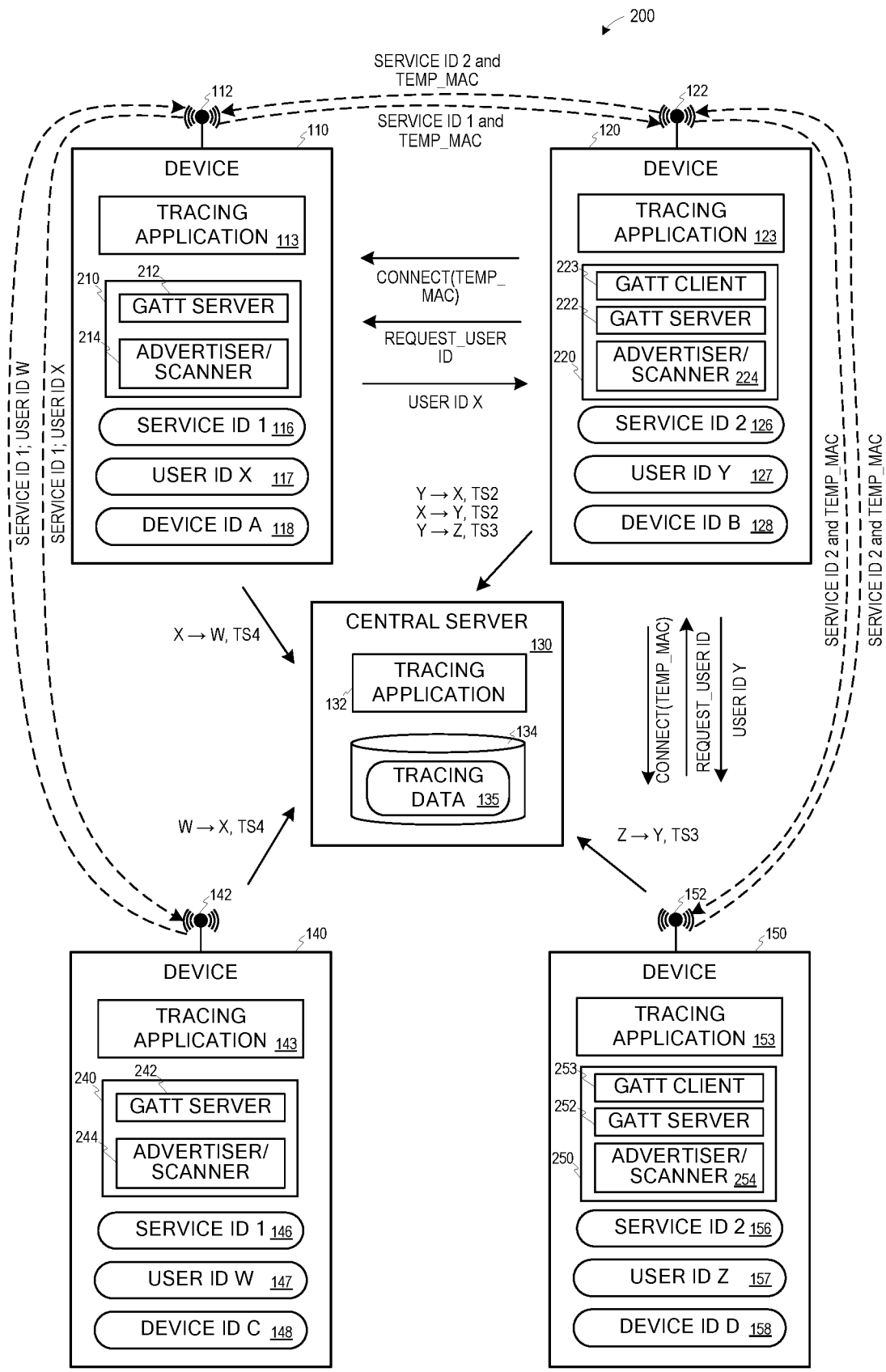
FIG. 2 is an architecture of a system to provide device tracing according to some embodiments.

FIG. 2 illustrates architecture 200 including more-specific implementations of devices 110 and 120, as well as devices 140 and 150. It will be assumed that devices 110 and 140 execute an Android operating system and devices 120 and 150 execute an iOS operating system. Accordingly, architecture 200 depicts Android-Android, iOS-iOS, Android-iOS, and iOS-Android communication according to some embodiments. Advantageously, and as will be described below, each Android-based device executes a same algorithm regardless of the operating system which happens to be executed by a proximate device and each iOS-based device also executes a same algorithm regardless of the operating system executed by a proximate device.

Turning to devices 110 and 120 of FIG. 2, the wireless communication components of FIG. 1 have been replaced with Bluetooth LE-specific components. Specifically, wireless communication component 115 of device 110 has been replaced with Bluetooth LE component 210, including advertiser/scanner 214 and GATT server 212. Device 110 is still assumed to be an Android-based device. Wireless communication component 125 of device 120 has been replaced with Bluetooth LE component 220, including advertiser/scanner 224, GATT server 222 and GATT client 223. Device 120 is an iOS-based device in the present example.

Device 140 is an Android-based device and device 150 is an iOS-based device. Device 140 includes tracing application 143 which may comprise a same application as tracing application 113 of Android-based device 120, and Bluetooth LE component 240 including advertiser/scanner 244 and GATT server 242. Device 140 also stores service ID 1 146 associated with tracing application 143, user ID W 147 associated with the user of device 140, and device ID C 148, which may comprise a temporary Bluetooth MAC address.

Similar to device 130, device 150 includes tracing application 153 which may comprise a same application as tracing application 123, and Bluetooth LE component 250 including advertiser/scanner 254, GATT server 252 and GATT client 250. Device 150 also stores service ID 2 156 associated with tracing application 153, user ID Z 157 associated with the user of device 150, and device ID D 158, which may comprise a temporary Bluetooth MAC address.

For purposes of the following description, it will be assumed that devices 110 and 120 are proximate to each other at time TS2, devices 120 and 150 are proximate to each other at time TS3, and devices 110 and 140 are proximate to each other at time TS4.

Figure 3:
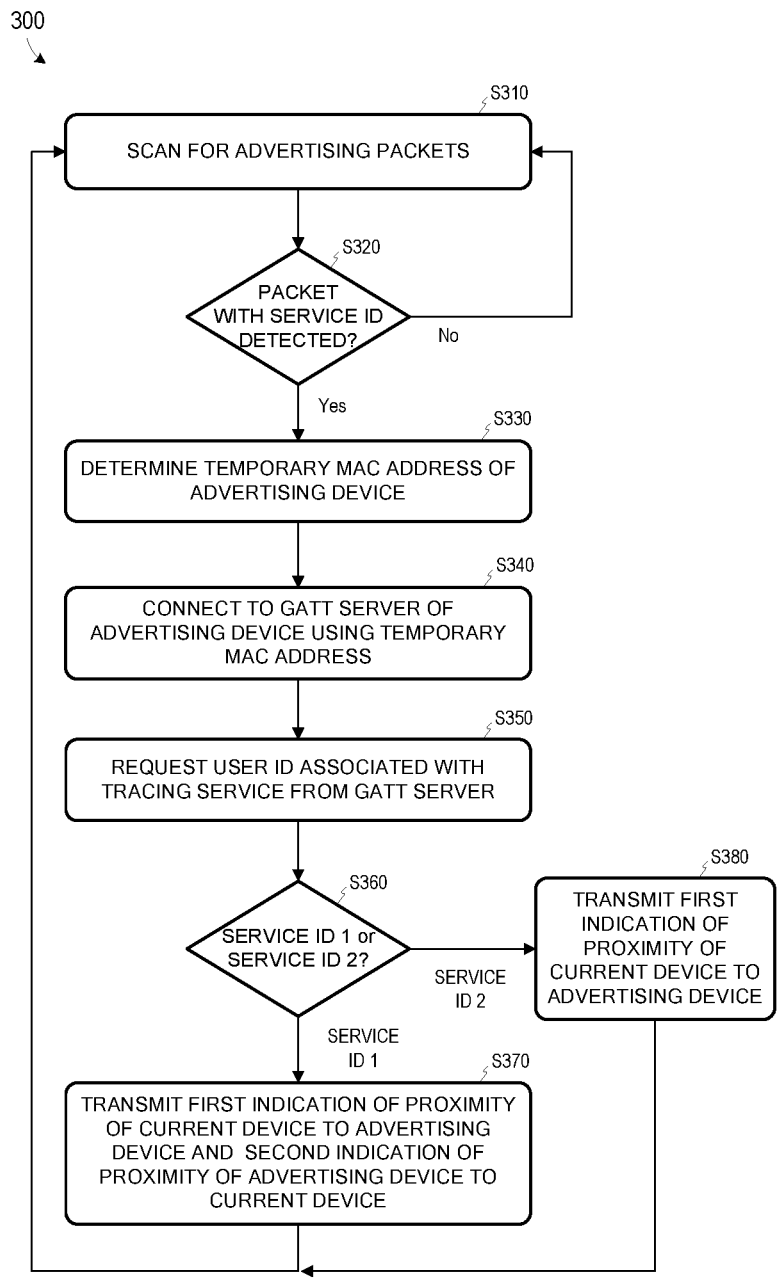
FIG. 3 is a flow diagram of a process to provide device tracing according to some embodiments.

FIG. 3 is a flow diagram of process 300 according to some embodiments. Process 300 may be performed by each iOS device within a tracing architecture according to some embodiments. Accordingly, process 300 may be implemented by program code of a tracing application and a Bluetooth LE API. Such program code may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Process 300 may be implemented by both of devices 120 and 150 and will be initially described with respect to device 120. Prior to S310, tracing application 123 is executed in order to initiate process 300. For example, tracing application 123 may be initiated by a user of device 120 in order to begin participation in device tracing (i.e., detecting other devices and being detected by other devices) according to some embodiments.

Upon execution of application 123, scanner 224 of device 120 beings scanning for advertiser packets broadcast by a Bluetooth LE advertiser at S310. Scanner 224 detects any advertiser packets broadcast within a particular range of antenna 122. At S320, it is determined whether a received advertiser packet includes service ID 1 (associated with Android-compatible tracing applications) or service ID 2 (associated with iOS-compatible tracing applications). It should be understood that, while device 120 scans for an advertiser packet including one of the two service IDs in order to detect proximate devices, advertiser 224 of device 120 is also broadcasting advertiser packets from antenna 122 including service ID 2 in order to allow itself to be detected by proximate devices.

Flow cycles between S320 and S310 until an advertiser packet including service ID or service ID 2 is detected. The temporary MAC address of the advertising device is determined from the advertising packet at S330. For purposes of the present example, it will be assumed that the advertiser packet was received from device 110 and the determined temporary MAC address is device ID A.

Next, at S340, device 120 connects to a GATT server of the advertising device using the temporary MAC address determined at S330. FIG. 2 illustrates transmission of a signal from GATT client 223 of device 120 to GATT server 212 of advertising device 110 to establish a connection therebetween. Once the connection is established, a user ID associated with the advertising device and the tracing service is requested from the advertising device at S350. FIG. 2 further shows GATT client 223 requesting and receiving user ID X from GATT server 212.

Device 120 may locally store data indicating the detection of user ID X and a time at which the detection occurred. After a given time period, and/or based on any other suitable trigger (e.g., detection of a Wi-Fi internet connection), device 120 determines whether the received service ID was service ID 1 or service ID 2. In the present example, the received service ID is service ID 1, so flow proceeds to S370 to transmit a first indication of proximity of a user of the current device to the user of the advertiser device and a second indication of proximity of the user of the advertiser device to the user of the current device. With reference to FIG. 2, these indications may be broadcast to tracing application 132 executing on central server 130 as Y→X, TS2 and X→Y, TS2, and stored in tracing data 135.

Flow returns from S360 to S310 to resume scanning, as long as tracing application 123 continues to execute. It will be assumed that device 120 now comes into proximity with device 150 and detects an advertiser packet transmitted from antenna 152 of device 150. At S320, it is determined that the advertiser packet includes service ID 2 associated with tracing application 132. The temporary MAC address device ID D of advertising device 150 is then determined from the advertising packet at S330.

At S340, and as illustrated in FIG. 2, GATT client 223 of device 120 connects to GATT server 252 of advertising device 150 using the temporary MAC address determined at S330. Once the connection is established, GATT client 223 further requests a user ID associated with the advertising device and the tracing service from GATT server 252 at S350.

Device 120 locally stores data indicating the detection of user ID Z and a time at which the detection occurred. Since the received service ID was service ID 2, flow proceeds from S360 to S380 to transmit a first indication of proximity of a user of the current device to the user of the advertiser device. Again with reference to FIG. 2, this indications may be broadcast to tracing application 132 executing on central server 130 as Y→Z, TS3 and stored in tracing data 135.

Accordingly, detection of Android-based device 110 by iOS-based device 120 results in transmission of Y→X, TS2 and X→Y, TS2, while detection of iOS-based device 150 by iOS-based device 120 results in transmission of Y→Z, TS3. This feature compensates for the fact that the present architecture does not utilize detection of iOS-based devices by Android-based devices for the reasons described above, and therefore the tracing data which would be generated by an Android-based device in response to detection of an iOS-based device is "simulated" by the iOS-based device in response to its detection of the Android-based device.

As mentioned above, device 150 is an iOS device and device 120 broadcasts advertiser packets while executing process 300. Device 150 may therefore also and simultaneously execute tracing application 153 to perform process 300 with respect to device 120. For example, while device 120 executes process 300 to detect user ID Z of device 150, device 150 may detect an advertiser packet transmitted by device 120 and determine that the advertiser packet includes service ID 2. Device 150 then determines the temporary MAC address device ID B of advertising device 120 from the advertising packet at S330.

GATT client 253 of device 150 connects to GATT server 222 of advertising device 120 using the temporary MAC address (i.e., device ID B) determined at S330. Once the connection is established, GATT client 253 requests a user ID associated with the advertising device and the tracing service from GATT server 222 at S350, and user ID Y is returned thereto.

Device 150 stores data indicating the detection of user ID Y and a time at which the detection occurred. Since the received service ID was service ID 2, flow proceeds from S360 to S380 to transmit a first indication of proximity of a user of the current device to the user of the advertiser device. This indication may be broadcast to tracing application 132 executing on central server 130 as Z→Y, TS3 as shown in FIG. 2, and stored in tracing data 135.

Figure 4:
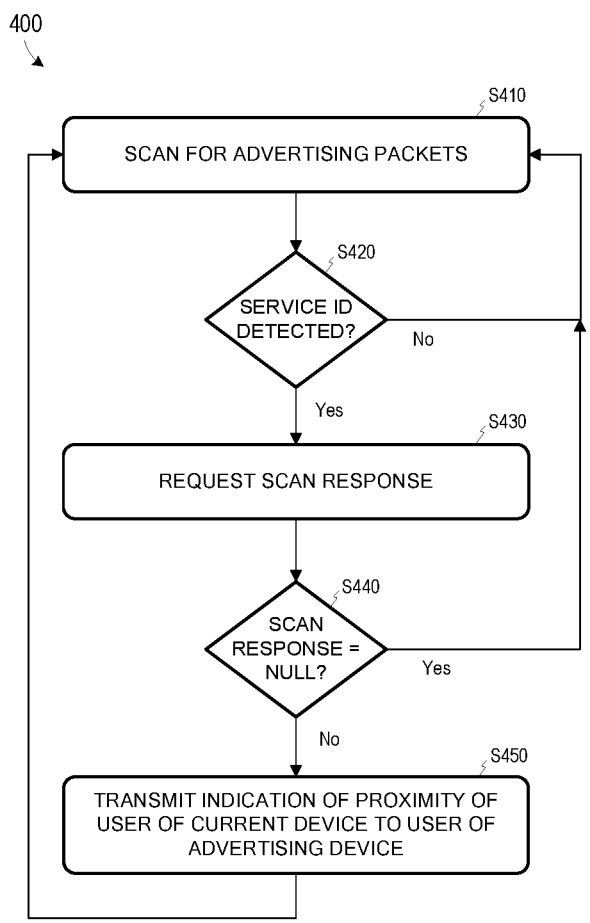
FIG. 4 is a flow diagram of a process to provide device tracing according to some embodiments

Process 400 of FIG. 4 may be executed by Android-based devices within a tracing architecture according to some embodiments. Process 400 may be implemented by program code of a tracing application and a Bluetooth LE API for execution on an Android operating system within such devices.

As mentioned above, devices 110 and 140 may comprise Android-based devices. Upon execution of tracing applications 113 and 143, advertisers 214 and 224 of respective devices 110 and 140 broadcast advertising packets including service ID 1 associated with the tracing application. Advertisers 214 and 224 may also receive requests for a scan response packet from scanners per the Bluetooth LE specification, in response to which advertisers 214 and 224 provide a scan response packet include a user ID associated with a user of their respective device.

Process 400 will be described with respect to device 110. Scanner 214 scans for advertising packets at S410 until, at S420, an advertiser packet including service ID 1 or service ID 2 of a tracing application is detected. Initially, it will be assumed that such a packet is detected from device 140.

Next, at S430, scanner 214 requests a scan response from advertiser 244 of device 140. In response, advertiser 244 provides a scan response packet including user ID W. Since the scan response is not NULL, flow proceeds from S440 to S450. At S450, which may occur well after S430 depending upon the protocol for transmitting tracing data to central server 130, an indication of proximity of a user of the current device to the user of the advertising device is transmitted. According to the present example, the indication may comprise X→W, TS4.

During the above process, device 140 may also execute process 400 to detect advertiser packets transmitted by advertiser 214 of device 120 and including service ID 1. Accordingly, at S430, scanner 244 requests a scan response from advertiser 214 and receives a scan response packet including user ID X therefrom. The scan response is not NULL and flow therefore proceeds to S450 to transmit an indication of proximity of a user of the current device to the user of the advertising device. In this example, the indication may comprise W→X, TS4 as shown in FIG. 2.

As noted above, devices 110 and 120 are proximate to each other at time TS2, and device 120 detects user ID X of device 110 at that time via process 300. At TS2, and by virtue of execution of tracing application 123, advertiser 224 of device 120 operates to broadcast advertiser packets including service ID 2. These packets are detected by scanner 214 of device 110 at S420.

Next, at S430, scanner 214 requests a scan response packet from advertiser 224. However, due to operation of iOS-based implementations of Bluetooth LE, the resulting scan response packet received from advertiser 224 includes NULL, and not a user ID. Accordingly, flow returns to S410 from S440 and device 110 records no indication of its proximity to device 120. Due to this omission, iOS-based devices provide two indications of proximity (i.e., one indication from the point of view of each proximate device) as described with respect to S380.

FIG. 5 illustrates a tabular representation of tracing data 500 collected by a central server according to some embodiments. Tracing data 500 includes the transmitted data shown in FIG. 2. From tracing data 500, it is possible to determine a time at which a user was proximate to another user. Additionally, secondary (or tertiary, etc.) contacts may be determined from tracing data 500. For example, tracing data 500 shows that user ID W was only directly proximate to user ID X, but is a secondary contact of user ID Y due to user ID X's proximity to user ID Y at TS2. Accordingly, if it is determined that user ID X or user ID Y were contagious at TS2, user ID W could be notified of potential exposure. However, user ID W is not a tertiary contact of user ID Z even though tracing data 500 shows user ID Y proximate to user ID Z at TS3 because user ID Y was proximate to user ID Z after user ID Y was proximate to user ID X.

Figure 6:
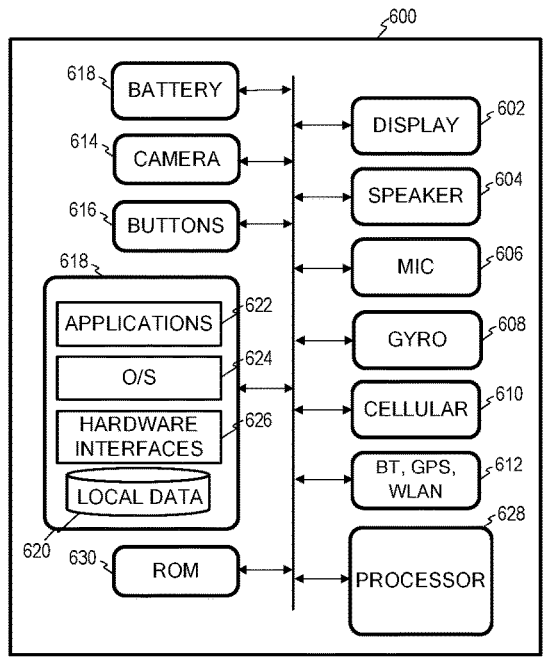
FIG. 6 is a block diagram of a device architecture according to some embodiments.

FIG. 6 is a block diagram of mobile phone 600 according to some embodiments. Mobile phone 600 may include more or fewer components than illustrated. Mobile phone 600 may comprise an Android-based, iOS-based or other operating system. Mobile phone 600 includes input devices such as buttons 616, touch-sensitive display 602 and microphone 606, using which commands may be input to device 600 such as commands to initiate a tracing application.

Other mobile phone-specific components include camera 614, gyroscope 608, cellular network interface 610, and wireless interface 612 for Bluetooth, GPS and WLAN communication. Random access memory 618 includes program code of applications 622 such as a tracing application, operating system 624 and hardware interfaces 626 such as drivers and associated APIs. Such program code may be executed by processor 628 to cause mobile phone 600 to perform desired functions. Local data 620 may comprise tracing data, user IDs, service IDs and any other suitable data required for operation of phone 600. Read only memory 630 may store boot code and other non-modifiable data.

Figure 7:
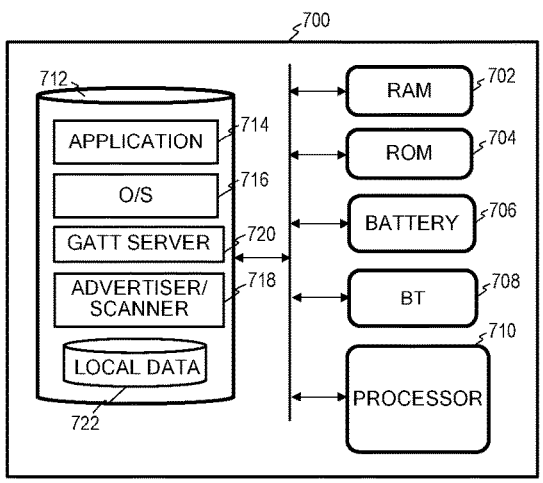
FIG. 7 is a block diagram of a device architecture according to some embodiments.

Embodiments are not limited to mobile phone implementations. FIG. 7 is a block diagram of device 700 which may comprise an Android-based computing device supporting Bluetooth LE. Device 700 includes persistent storage 712 storing application 714 such as tracing application 113, operating system 716 (e.g., Android-based), GATT server 720 and advertiser/scanner 718. Accordingly, device 700 may perform process 400 and other processes attributed herein to Android-based devices. Local data 722 may store proximity data generated during performance of such processes.

Figure 8:
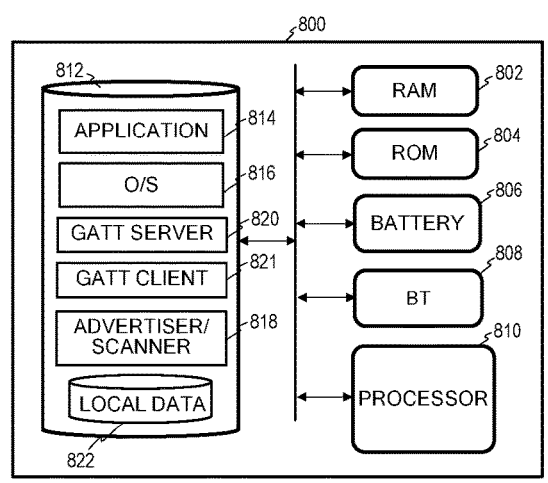
FIG. 8 is a block diagram of a device architecture according to some embodiments.

Similarly, FIG. 8 is a block diagram of device 800 which may comprise an iOS-based non-mobile phone computing device supporting Bluetooth LE. Device 800 includes persistent storage 812 storing application 814 such as a tracing application 123, operating system 816 (e.g., iOS-based), GATT server 820, GATT client 821 and advertiser/scanner 818. Device 800 may perform process 300 and other processes attributed herein to iOS-based devices, and local data 822 may store proximity data generated during performance of such processes.

Figure 9:
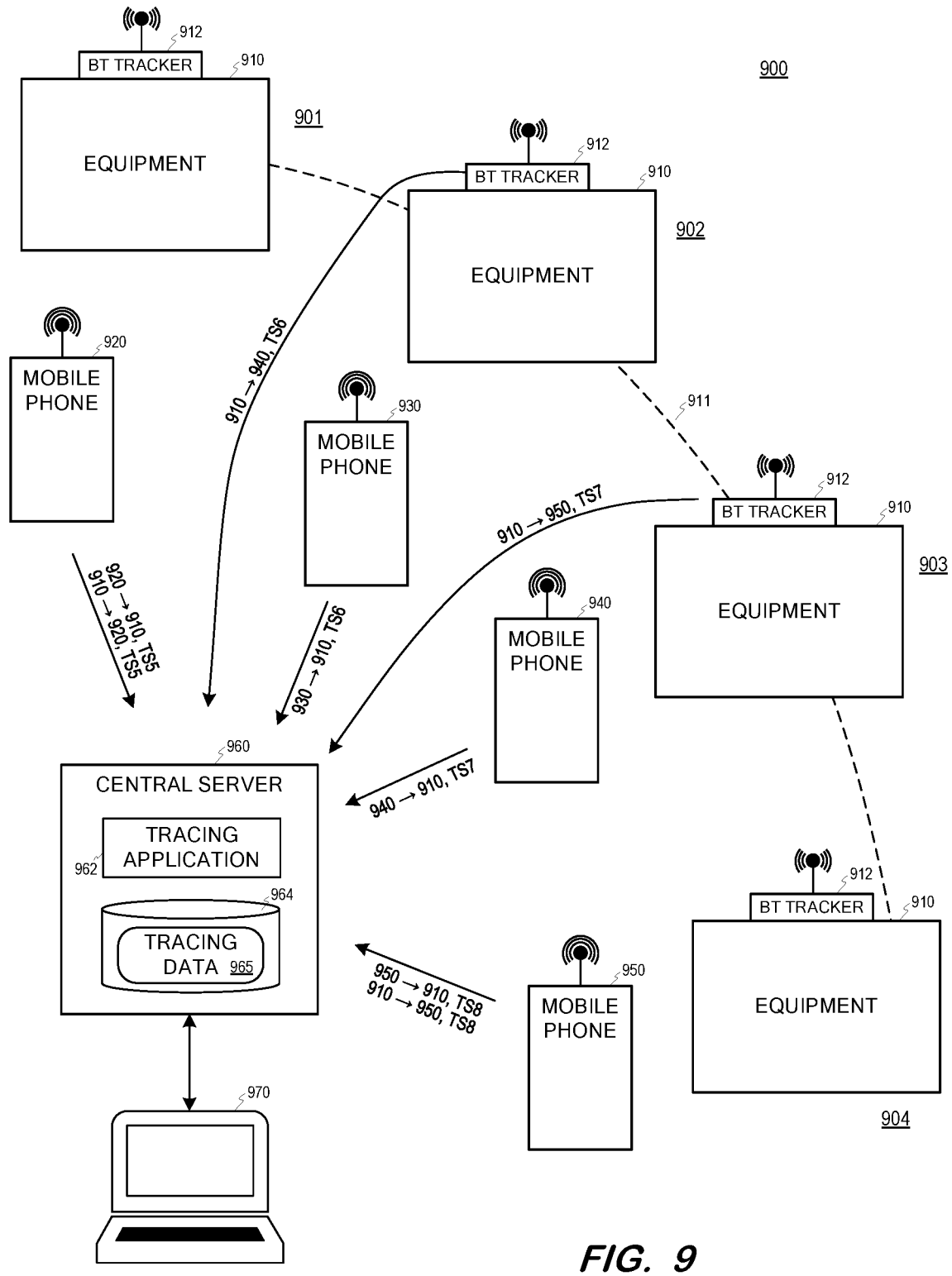
FIG. 9 depicts an implementation of device tracing according to some embodiments.

FIG. 9 illustrates an architecture for equipment tracing according to some embodiments. Tracing architectures are not limited to that depicted in FIG. 9.

Environment 900 may comprise a factory, assembly line, manufacturing campus, or any other environment in which it may be desirable to trace the location of a physical structure. In the illustrated example, the physical structure to be traced is equipment 910, which may comprise a tool or vehicle, for example. Equipment 910 may be leased to an entity which owns environment 900, and the lessor utilizes device tracing according to some embodiments to monitor movement of equipment 910 within environment 900. As depicted by dashed line 911, such movement includes movement from location 901 to location 904, passing through locations 902 and 903 in the interim.

Bluetooth tracker 912 is physically coupled to equipment 910 via any suitable means. Bluetooth tracker 912 may be implemented as shown in FIG. 7 or 8, but embodiments are not limited thereto. In the illustrated example, Bluetooth tracker 912 is an Android-based device and need not comprise a mobile phone. In some embodiments, Bluetooth tracker 912 is integrated with and/or in a chassis of equipment 910, which may prevent tampering and increase robustness and reliability.

Mobile phones 920, 930, 940 and 950 may comprise mobile phones carried by employees working within environment 900. The following description (and FIG. 9) assumes that mobile phones 920 and 950 are iOS-based mobile phones and execute process 200, while mobile phones 930 and 940 are Android-based mobile phones and execute process 300. Mobile phones 920, 930, 940 and 950 may comprise any devices as described herein, and one or more of mobile phones 920, 930, 940 and 950 may be fixed to a location within environment 900. Architectures according to some embodiments may use mobile phones as well as dedicated devices (e.g., devices 700 and/or 800) to provide tracing of equipment within environment 900.

While positioned at location 901, tracker 912 is assumed to be sufficiently proximate to mobile phone 920 to receive advertising packets broadcast thereby and therefore executes process 400 with respect to the advertising packets. Similarly, mobile phone 920 receives advertising packets broadcast by tracker 912 and executes process 300 with respect to these packets. In this regard, it is assumed that all devices of FIG. 9 execute a tracing application associated with a common service ID. As described above, since tracker 912 is an Android-based device and mobile phone 920 is an iOS-based device, tracker 912 generates no tracing data based on its received advertising packets and mobile phone 920 generates tracing data indicating its proximity to tracker 912 and the proximity of tracker 912 to itself (e.g., 920→910, TS5 and 910→920, TS5).

According to some embodiments, tracing data generated by any of mobile phones 920, 930, 940 and 950 may further include data specifying the phone's location, as determined via the phone's internal GPS receiver, cellular network interface, or otherwise. Such embodiments may provide tracing of an actual location of equipment 910 without requiring Bluetooth tracker 912 to include location-tracking components.

The tracing data may be transmitted from mobile phone 920 to central server 960 asynchronously and in response to any suitable trigger. As described above, central server 960 stores the received data as tracing data 965 in persistent storage 964. Tracing application 962 may be accessed by an operator of remote device 970 (e.g., a lessor of equipment 910) to analyze tracing data 965 and thereby monitor the movement of equipment 910.

Equipment 910 moves to location 902 at time TS6. At location 902, tracker 912 and mobile phone 930 are sufficiently proximate to receive each other's advertising packets. Again, tracker 912 executes process 400 with respect to its received advertising packets. Mobile phone 930, which is an Android-based device also executes process 400 with respect to its received advertising packets. Accordingly, both tracker 912 and mobile phone 930 generate tracing data indicating their proximity to one another (e.g., 930→910, TS6; 910→930, TS6). Each of tracker 912 and mobile phone 930 transmit their respective data to central server 960 as shown.

At location 903, tracker 912 and mobile phone 940 operate as described above with respect to equipment 910 and mobile phone 930. Each of tracker 912 and mobile phone 940 transmit their respective data (e.g., 940→910, TS7; 910→940, TS7) to central server 960 as shown.

Tracker 912 and iOS-based mobile phone 950 communicate at location 904 as described above with respect to tracker 912 and mobile phone 920. Tracker 912 generates no tracing data based on advertising packets received from mobile phone 950 and mobile phone 950 generates tracing data indicating its proximity to tracker 912 and the proximity of tracker 912 to itself (e.g., 950→910, TS8 and 910→950, TS8). Mobile phone 950 transmits this data to central server 960 as shown.

All data storage mentioned herein may be provided via combinations of magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
    a first device comprising:
    a memory storing processor-executable program code;
    a processing unit to execute the processor-executable program code to cause the first device to:
    receive a wireless communication packet from a second device;
    determine a received service identifier included in the wireless communication packet;
    determine whether the received service identifier matches a first service identifier or a second service identifier;
    if the received service identifier matches the first service identifier or the second service identifier, establish a connection to a server of the second device using a device address included in the wireless communication packet;
    request, using the connection, a user identifier from the server of the second device;
    if the received service identifier matches the first service identifier, transmit, to a remote server, a first indication of proximity of a user of the first device to a user associated with the user identifier and a second indication of proximity of the user associated with the user identifier to the user of the first device; and if the received service identifier matches the second service identifier, transmit, to the remote server, the first indication of proximity of the user of the first device to a user associated with the user identifier and do not transmit, to the remote server, the second indication of proximity of the user associated with the user identifier to the user of the first device.

2. A system according to claim 1, wherein the wireless communication packet is a Bluetooth Low Energy advertising packet and the server of the second device is a Generic Attribute Profile server.

3. A system according to claim 1, the processing unit to execute the processor-executable program code to cause the system to:
receive a second wireless communication packet from a third device;
determine a second received service identifier included in the second wireless communication packet;
determine whether the second received service identifier matches the first service identifier or the second service identifier;
if the second received service identifier matches the first service identifier or the second service identifier, establish a connection to a server of the third device using a second device address included in the second wireless communication packet;
request, using the connection to the server of the third device, a second user identifier from the server of the third device;
if the second received service identifier matches the first service identifier, transmit, to the remote server, a third indication of proximity of the user of the first device to a user associated with the second user identifier and a fourth indication of proximity of the user associated with the second user identifier to the user of the first device; and
if the second received service identifier matches the second service identifier, transmit, to the remote server, the fourth indication of proximity of the user associated with the second user identifier to the user of the first device and do not transmit, to the remote server, the third indication of proximity.

4. A system according to claim 1, further comprising:
the second device, comprising:
a second memory storing processor-executable program code;
a second processing unit to execute the processor-executable program code to cause the second device to:
receive a second wireless communication packet from the first device;
determine a second received service identifier included in the second wireless communication packet;
determine whether the second received service identifier matches the first service identifier or the second service identifier;
if the second received service identifier matches the first service identifier or the second service identifier, request a scan response from the first device;
receive a scan response packet from the first device in response to the request; and
determine that the scan response packet includes a NULL value.

5. A system according to claim 4, further comprising:
a third device comprising:
a third memory storing processor-executable program code;
a third processing unit to execute the processor-executable program code to cause the third device to:
receive a third wireless communication packet from the second device;
determine a third received service identifier included in the third wireless communication packet;
determine whether the third received service identifier matches the first service identifier or the second service identifier;
if the third received service identifier matches the first service identifier or the second service identifier, request a scan response from the second device;
receive a second scan response packet from the second device in response to the request;
determine that the second scan response packet includes the second user identifier; and
in response to the determination that the scan response packet includes the second user identifier, transmit, to the remote server, a third indication of proximity of a user of the third device to the user associated with the second user identifier.

6. A system according to claim 4, wherein the wireless communication packet and the second wireless communication packet are Bluetooth Low Energy advertising packets, the server of the second device is a Generic Attribute Profile server, the first device executes an iOS-based operating system and the second device executes an Android-based operating system.

7. A method comprising:
receiving, at a first device, a wireless communication packet from a second device;
determining, at the first device, a received service identifier included in the wireless communication packet;
determining, at the first device, whether the received service identifier matches a first service identifier or a second service identifier;
if the received service identifier matches the first service identifier or the second service identifier, establishing, at the first device, a connection to a server of the second device using a device address included in the wireless communication packet;
requesting, using the connection and at the first device, a user identifier from the server of the second device;
if the received service identifier matches the first service identifier, transmitting, from the first device to a remote server, a first indication of proximity of a user of the first device to a user associated with the user identifier and a second indication of proximity of the user associated with the user identifier to the user of the first device; and
if the received service identifier matches the second service identifier, transmitting, from the first device to the remote server, the first indication of proximity of the user of the first device to a user associated with the user identifier and not transmitting, from the first device to the remote server, the second indication of proximity of the user associated with the user identifier to the user of the first device.

8. A method according to claim 7, wherein the wireless communication packet is a Bluetooth Low Energy advertising packet and the server of the second device is a Generic Attribute Profile server.

9. A method according to claim 7, further comprising:
receiving, at the first device, a second wireless communication packet from a third device;

determining, at the first device, a second received service identifier included in the second wireless communication packet;

determining, at the first device, whether the second received service identifier matches the first service identifier or the second service identifier;

if the second received service identifier matches the first service identifier or the second service identifier, establishing, at the first device, a connection to a server of the third device using a second device address included in the second wireless communication packet;

requesting, at the first device and using the connection to the server of the third device, a second user identifier from the server of the third device;

if the second received service identifier matches the first service identifier, transmitting, from the first device to the remote server, a third indication of proximity of the user of the first device to a user associated with the second user identifier and a fourth indication of proximity of the user associated with the second user identifier to the user of the first device; and if the second received service identifier matches the second service identifier, transmitting, from the first device to the remote server, the fourth indication of proximity of the user associated with the second user identifier to the user of the first device and not transmitting, from the first device to the remote server, the third indication of proximity of the user of the first device to a user associated with the second user identifier.

10. A method according to claim 7, further comprising:

receiving, at the second device, a second wireless communication packet from the first device;

determining, at the second device, a second received service identifier included in the second wireless communication packet;

determining, at the second device, whether the second received service identifier matches the first service identifier or the second service identifier;

if the second received service identifier matches the first service identifier or the second service identifier, requesting, at the second device, a scan response from the first device;

receiving, at the second device, a scan response packet from the first device in response to the request; and determining that the scan response packet includes a NULL value.

11. A method according to claim 10, further comprising:

receiving, at a third device, a third wireless communication packet from the second device;

determining, at the third device, a third received service identifier included in the third wireless communication packet;

determining, at the third device, whether the third received service identifier matches the first service identifier or the second service identifier;

if the third received service identifier matches the first service identifier or the second service identifier, requesting, at the third device, a scan response from the second device;

receiving, at the third device, a second scan response packet from the second device in response to the request;

determining, at the third device, that the second scan response packet includes the second user identifier; and in response to the determination that the scan response packet includes the second user identifier, transmitting, from the third device to the remote server, a third indication of proximity of a user of the third device to the user associated with the second user identifier.

12. A method according to claim 10, wherein the wireless communication packet and the second wireless communication packet are Bluetooth Low Energy advertising packets, the server of the second device is a Generic Attribute Profile server, the first device executes an iOS-based operating system and the second device executes an Android-based operating system.

13. A non-transitory computer-readable medium storing program code executable to cause:

reception, at a first device, of a wireless communication packet from a second device;

determination, at the first device, of a received service identifier included in the wireless communication packet;

determination, at the first device, of whether the received service identifier matches a first service identifier or a second service identifier;

if the received service identifier matches the first service identifier or the second service identifier, establishment, at the first device, of a connection to a server of the second device using a device address included in the wireless communication packet;

requesting, using the connection and at the first device, of a user identifier from the server of the second device;

if the received service identifier matches the first service identifier, transmission, from the first device to a remote server, of a first indication of proximity of a user of the first device to a user associated with the user identifier and a second indication of proximity of the user associated with the user identifier to the user of the first device; and if the received service identifier matches the second service identifier, transmission, from the first device to the remote server, of the first indication of proximity of the user of the first device to a user associated with the user identifier and to not cause transmission, from the first device to the remote server, of the second indication of proximity of the user associated with the user identifier to the user of the first device.

14. A medium according to claim 13, wherein the wireless communication packet is a Bluetooth Low Energy advertising packet and the server of the second device is a Generic Attribute Profile server.

15. A medium according to claim 13, the program code executable to cause:

reception, at the first device, of a second wireless communication packet from a third device;

determination, at the first device, of a second received service identifier included in the second wireless communication packet;

determination, at the first device, of whether the second received service identifier matches the first service identifier or the second service identifier;

if the second received service identifier matches the first service identifier or the second service identifier, establishment, at the first device, of a connection to a server of the third device using a second device address included in the second wireless communication packet;

request, at the first device and using the connection to the server of the third device, of a second user identifier from the server of the third device;

if the second received service identifier matches the first service identifier, transmission, from the first device to the remote server, of a third indication of proximity of the user of the first device to a user associated with the second user identifier and a fourth indication of proximity of the user associated with the second user identifier to the user of the first device; and if the second received service identifier matches the second service identifier, transmission, from the first device to the remote server, of the fourth indication of proximity of the user associated with the second user identifier to the user of the first device and to not cause transmission, from the first device to the remote server, of the third indication of proximity of the user of the first device to a user associated with the second user identifier.

16. A medium according to claim 13, the program code executable to cause:

reception, at the second device, of a second wireless communication packet from the first device;

determination, at the second device, of a second received service identifier included in the second wireless communication packet;

determination, at the second device, of whether the second received service identifier matches the first service identifier or the second service identifier;

if the second received service identifier matches the first service identifier or the second service identifier, request, at the second device, of a scan response from the first device;

reception, at the second device, of a scan response packet from the first device in response to the request; and determination that the scan response packet includes a NULL value.

17. A medium according to claim 16, the program code executable to cause:

reception, at a third device, of a third wireless communication packet from the second device;

determination, at the third device, of a third received service identifier included in the third wireless communication packet;

determination, at the third device, of whether the third received service identifier matches the first service identifier or the second service identifier;

if the third received service identifier matches the first service identifier or the second service identifier, request, at the third device, of a scan response from the second device;

reception, at the third device, of a second scan response packet from the second device in response to the request;

determination, at the third device, that the second scan response packet includes the second user identifier; and in response to the determination that the scan response packet includes the second user identifier, transmission, from the third device to the remote server, of a third indication of proximity of a user of the third device to the user associated with the second user identifier.

18. A medium according to claim 16, wherein the wireless communication packet and the second wireless communication packet are Bluetooth Low Energy advertising packets, the server of the second device is a Generic Attribute Profile server, the first device executes an iOS-based operating system and the second device executes an Android-based operating system.

* * * * *